United States Patent
Kembaiyan

(10) Patent No.: US 7,389,834 B1
(45) Date of Patent: *Jun. 24, 2008

(54) BRAZE ALLOYS

(75) Inventor: Kumar T Kembaiyan, The Woodlands, TX (US)

(73) Assignee: Smith International, Inc., Houston, TX (US)

( * ) Notice: Subject to any disclaimer, the term of this patent is extended or adjusted under 35 U.S.C. 154(b) by 176 days.

This patent is subject to a terminal disclaimer.

(21) Appl. No.: 10/952,502

(22) Filed: Sep. 28, 2004

Related U.S. Application Data

(60) Provisional application No. 60/506,871, filed on Sep. 29, 2003.

(51) Int. Cl.
*E21B 10/567* (2006.01)
(52) U.S. Cl. ...................................... 175/435
(58) Field of Classification Search ................ 175/374, 175/425
See application file for complete search history.

(56) References Cited

U.S. PATENT DOCUMENTS

| | | | |
|---|---|---|---|
| 4,009,027 A | 2/1977 | Naidich et al. | |
| 4,052,531 A * | 10/1977 | Steine et al. | 428/673 |
| 4,453,605 A * | 6/1984 | Short, Jr. | 175/433 |
| 5,314,109 A | 5/1994 | Farzin-Nia | |
| 5,341,981 A | 8/1994 | Weise et al. | |
| 5,352,542 A | 10/1994 | Voelcker et al. | |
| 5,851,482 A | 12/1998 | Kim | |
| 5,972,288 A | 10/1999 | Jeong et al. | |
| 6,033,488 A | 3/2000 | An et al. | |
| 6,193,930 B1 | 2/2001 | Allnatt | |
| 6,299,835 B1 * | 10/2001 | Weise et al. | 420/504 |
| 6,413,330 B1 | 7/2002 | Oishi | |
| 6,596,229 B2 | 7/2003 | Linn et al. | |
| 6,772,849 B2 | 8/2004 | Oldham et al. | |
| 2005/0087371 A1 * | 4/2005 | Kembaiyan | 175/435 |
| 2005/0089440 A1 * | 4/2005 | Kembaiyan | 420/502 |

FOREIGN PATENT DOCUMENTS

| | | | |
|---|---|---|---|
| DE | 2745409 | | 4/1979 |
| DE | 2745409 | * | 12/1979 |
| EP | 1078711 | B1 | 2/2001 |
| JP | 407051887 | * | 2/1995 |
| JP | 2001087889 | | 4/2001 |
| NZ | 508379 | | 12/2001 |

OTHER PUBLICATIONS www.bellmanmelcor.com/silvaloy_A56T.htm; date viewed Aug. 26, 2003.

M. Schwartz, Brazing: For the Engineering Technologist; 1995 p. 374;table A.12; p. 376;table A.14; Chapman & Hall, London.

* cited by examiner

*Primary Examiner*—William P Neuder
(74) *Attorney, Agent, or Firm*—Y. Renee Alsandor

(57) ABSTRACT

An improved braze alloy is microalloyed to include about 0.0005 wt % to about 0.5 wt % of at least one aggressively surface acting element selected from tellurium (Te), selenium (Se), antimony (Sb), bismuth (Bi), and gallium (Ga), or any combination thereof. The braze alloys may include at least about 30% by weight of at least one base metal selected from the group of silver (Ag), copper (Cu), gold (Au), nickel (Ni), or aluminum (Al). In one example, a silver braze alloy suitable for brazing a cutter to a drill bit body is microalloyed to improve a characteristic of the braze material.

22 Claims, 4 Drawing Sheets

Table A.14 Typical composition and properties of standard filler metals for brazing stainless steels (silver based)

| Filler metal | Composition, (%) | | | | | | | | Other elements (total) | Solidus temperature (°C) | Solidus temperature (°F) | Liquidus temperature (°C) | Liquidus temperature (°F) | Brazing temperature range (°C) | Brazing temperature range (°F) |
|---|---|---|---|---|---|---|---|---|---|---|---|---|---|---|---|
| | Ag | Cu | Zn | Cd | Ni | Sn | Li | Mn | | | | | | | |
| BAg-1 | 44.0–46.0 | 14.0–16.0 | 14.0–18.0 | 23.0–25.0 | — | — | — | — | 0.15 | 607 | 1125 | 618 | 1145 | 618–760 | 1145–1400 |
| BAg-1a | 49.0–51.0 | 14.5–16.5 | 14.5–18.5 | 17.0–19.0 | — | — | — | — | 0.15 | 627 | 1160 | 635 | 1175 | 635–760 | 1175–1400 |
| BAg-2 | 34.0–36.0 | 25.0–27.0 | 19.0–23.0 | 17.0–19.0 | — | — | — | — | 0.15 | 607 | 1125 | 701 | 1295 | 701–843 | 1295–1550 |
| BAg-2a | 29.0–31.0 | 26.0–28.0 | 21.0–25.0 | 19.0–21.0 | — | — | — | — | 0.15 | 607 | 1125 | 710 | 1310 | 710–843 | 1310–1550 |
| BAg-3 | 49.0–51.0 | 14.5–16.5 | 13.5–17.5 | 15.0–17.0 | 2.5–3.5 | — | — | — | 0.15 | 632 | 1170 | 688 | 1270 | 688–816 | 1270–1500 |
| BAg-4 | 39.0–41.0 | 29.0–31.0 | 26.0–30.0 | — | 1.5–2.5 | — | — | — | 0.15 | 671 | 1240 | 779 | 1435 | 779–899 | 1435–1650 |
| BAg-5 | 44.0–46.0 | 29.0–31.0 | 23.0–27.0 | — | — | — | — | — | 0.15 | 677 | 1250 | 743 | 1370 | 743–843 | 1370–1550 |
| BAg-6 | 49.0–51.0 | 33.0–35.0 | 14.0–18.0 | — | — | — | — | — | 0.15 | 688 | 1270 | 774 | 1425 | 774–871 | 1425–1600 |
| BAg-7 | 55.0–57.0 | 21.0–23.0 | 15.0–19.0 | — | — | 4.5–5.5 | — | — | 0.15 | 618 | 1145 | 651 | 1205 | 651–760 | 1205–1400 |
| BAg-8 | 71.0–73.0 | Rem | — | — | — | — | — | — | 0.15 | 779 | 1435 | 779 | 1435 | 779–899 | 1435–1650 |
| BAg-8a | 71.0–73.0 | Rem | — | — | — | — | 0.25–0.50 | — | 0.15 | 766 | 1410 | 766 | 1410 | 766–871 | 1410–1600 |
| BAg-9 | 64.0–66.0 | 19.0–21.0 | 13.0–17.0 | — | — | — | — | — | 0.15 | 671 | 1240 | 713 | 1325 | 713–843 | 1325–1550 |
| BAg-10 | 69.0–71.0 | 19.0–21.0 | 8.0–12.0 | — | — | — | — | — | 0.15 | 690 | 1275 | 738 | 1360 | 738–843 | 1360–1550 |
| BAg-13 | 53.0–55.0 | Rem | 4.0–6.0 | — | 0.5–1.5 | — | — | — | 0.15 | 713 | 1325 | 857 | 1575 | 857–969 | 1575–1775 |
| BAg-13a | 55.0–57.0 | Rem | — | — | 1.5–2.5 | — | — | — | 0.15 | 771 | 1420 | 893 | 1640 | 871–982 | 1600–1800 |
| BAg-18 | 59.0–61.0 | Rem | — | — | — | 9.5–10.5 | — | — | 0.15 | 601 | 1115 | 713 | 1325 | 713–843 | 1325–1550 |
| BAg-19 | 92.0–93.0 | Rem | — | — | — | — | 0.15–0.30 | — | 0.15 | 760 | 1400 | 885 | 1635 | 877–982 | 1610–1800 |
| BAg-20 | 29.0–31.0 | 37.0–39.0 | 30.0–34.0 | — | — | — | — | — | 0.15 | 677 | 1250 | 766 | 1410 | 766–871 | 1410–1600 |
| BAg-21 | 62.0–64.0 | 27.5–29.5 | — | — | 2.0–3.0 | 5.0–7.0 | — | — | 0.15 | 690 | 1275 | 801 | 1475 | 801–899 | 1475–1650 |
| BAg-22 | 48.0–50.0 | 15.0–17.0 | 21.0–25.0 | — | 4.0–5.0 | — | — | 7.0–8.0 | 0.15 | 682 | 1260 | 699 | 1290 | 699–830 | 1290–1525 |
| BAg-23 | 84.0–86.0 | — | — | — | — | — | — | Rem | 0.15 | 960 | 1760 | 971 | 1780 | 971–1038 | 1780–1900 |
| BAg-24 | 49.0–51.0 | 19.0–21.0 | 26.0–30.0 | — | 1.5–2.5 | — | — | — | 0.15 | 660 | 1220 | 707 | 1305 | 707–843 | 1305–1550 |
| BAg-25 | 19.0–21.0 | 39.0–41.0 | 33.0–37.0 | — | — | — | — | 4.5–5.5 | 0.15 | 738 | 1360 | 790 | 1455 | 790–846 | 1455–1555 |
| BAg-26 | 24.0–26.0 | 37.0–39.0 | 31.0–35.0 | — | 1.5–2.5 | — | — | 1.5–2.5 | 0.15 | 707 | 1305 | 801 | 1475 | 801–871 | 1475–1600 |
| BAg-27 | 24.0–26.0 | 34.0–36.0 | 24.5–28.5 | 12.5–14.5 | — | — | — | — | 0.15 | 607 | 1125 | 746 | 1375 | 746–857 | 1375–1575 |
| BAg-28 | 39.0–41.0 | 29.0–31.0 | 26.0–30.0 | — | — | 1.5–2.5 | — | — | 0.15 | 649 | 1200 | 710 | 1310 | 710–843 | 1310–1550 |

Figure 5

BRAZE ALLOYS

CROSS-REFERENCE TO RELATED APPLICATIONS

This application claims priority, pursuant to 35 U.S.C. §119(e), to U.S. Provisional Patent Application Ser. No. 60/506,871, filed Sep. 29, 2003, which is incorporated herein by reference in its entirety.

STATEMENT REGARDING FEDERALLY SPONSORED RESEARCH OR DEVELOPMENT

Not applicable.

BACKGROUND OF INVENTION

1. Field of the Invention

The present invention relates to brazing material. More particularly, the present invention relates to a brazing material that is microalloyed to improve a characteristic of the brazing material.

2. Background Art

Base metals, including metals and metal alloys, can be joined in a number of different ways, such as by mechanical fastening, adhesive bonding, or using heat and a filler material to join the metals together. Metal joining techniques involving heat and filler materials are separated into three distinct classes known as soldering, brazing, and welding.

Soldering is a relatively low temperature metal joining process, which occurs at temperatures below 840° F. (450° C.). Soldering is a metallurgical bonding technique which involves the melting of a soldering alloy material between the surfaces of metallic members which is then allowed to cool to a solid state to join the metallic members together. Soldering offers relatively low joint strength for metallurgically bonding a base metal to another base metal. Soldering is often used in the electronics industry where the parts to be joined are not in motion or susceptible to large loads, stresses or impact. Metals typically used as the base metal for soldering alloys include lead, tin or zinc.

Welding is the highest temperature metal joining processes. Welding is used to join metal pieces together by raising the temperature at the seam between the base metals to be joined so that they are united by fusing, forging or pressure. Welding involves high temperatures that are close to the melting point of the base metals being joined, which is typically above 1830° F. (1000° C.). A filler metal, typically in the form of a welding rod, is usually used during a welding process to fill in the gaps between the base metals being joined and to facilitate the joining of the base metal metallurgically.

Brazing is a metal joining process that occurs at temperatures between those for soldering and welding. A braze joint offers higher joint strength (shear strength) than that of soldered. Referring to FIG. 1, brazing temperatures are above the melting point of the filler metal (braze 24) used and below the melting point of the base metals 20, 22 being joined. Brazing typically occurs at temperatures between 1100° F. and 1800° F. (600° C. to 1000° C.). Since the base metals 20, 22 are not melted by brazing, they typically retain most of their physical properties and the danger of metal distortion or warping, associated with welding, is minimized. Also, unlike soldering, brazing provides a strong metallic bond between the filler metal 24 and the base metals 20, 22 being joined. A properly made braze joint (like a weld joint) can in many cases be as strong as or stronger than the base materials themselves. However, brazing is typically more economical than welding because it is performed at lower temperatures and does not require the higher level skill set, accuracy, and attention to detail of welding. Metal alloys typically used as braze material (braze 24) include aluminum, copper, nickel, silver, or gold based alloys.

For brazing applications in particular, there is a desire for new or improved braze alloys that offer improved characteristics, such as higher braze strength and/or improved corrosion resistance. Also, in general, there is a desire for a brazing material that offers improved braze strength without significantly increasing braze temperature.

SUMMARY OF INVENTION

The present invention relates to metal alloys useful as brazing material. In accordance with embodiments of the present invention, the braze alloy is microalloyed to improve at least one characteristics.

In one aspect, the present invention provides a braze alloy comprises at least about 30% by weight of a base metal selected from the group of silver (Ag), copper (Cu), gold (Au), nickel (Ni), or aluminum (Al), and about 0.0005 wt % to about 0.5 wt % of at least one aggressively surface acting element selected from tellurium (Te), selenium (Se), antimony (Sb), and bismuth (Bi), gallium (Ga), or any combination thereof.

In another aspect, the present invention provides a method of making a braze alloy comprising: melting ingredients to provide a homogeneous molten braze alloy. The ingredients including at least about 30% by weight of a base metal selected from the group of silver (Ag), copper (Cu), gold (Au), nickel (Ni), or aluminum (Al), and about 0.0005 wt % to about 0.5 wt % of at least one aggressively surface acting element selected from tellurium (Te), selenium (Se), antimony (Sb), and bismuth (Bi), gallium (Ga), or any combination thereof. The method further includes converting said molten braze alloy to a form suitable for use as a braze alloy.

In another aspect, the present invention provides a method for joining a first metal containing member to a second metal containing member. The method includes: providing a braze alloy comprising between about 30% by weight of a base metal selected from the group of silver (Ag), copper (Cu), gold (Au), nickel (Ni), or aluminum (Al), and about 0.0005 wt % to about 0.5 wt % of at least one aggressively surface acting element selected from tellurium (Te), selenium (Se), antimony (Sb), and bismuth (Bi), gallium (Ga), or any combination thereof. The method further includes using the braze alloy to braze the first metal containing member and the second metal containing member together.

In accordance with another aspect of the present invention, a method for increasing the braze strength of a braze alloy while substantially maintaining the braze temperature, comprises: adding to a braze alloy composition between about 0.0005% to about 0.5% by weight of at least one selected from the group of tellurium (Te), selenium (Se), antimony (Sb), and bismuth (Bi), and gallium (Ga), or any combination thereof.

In another aspect, the invention provides a drill bit. The drill bit comprises a bit body and a cutter mounted on the bit body. A brazing material is disposed between the cutter and the bit body attaching the cutter to the bit body. The brazing material includes silver in an amount of at least about 30% by weight and at least one selected from the group of antimony (Sb), tellurium (Te), selenium (Se), bismuth (Bi), and gallium (Ga), or any combination thereof in an amount of 0.0005% to 0.5% by weight.

Other aspects and advantages of the invention will be apparent from the following description and the appended claims.

BRIEF DESCRIPTION OF DRAWINGS

FIG. 5 shows a table of typical compositions and properties of standard silver-based filler metals, including BAg-7, used as braze material for brazing base metals such as stainless steel and tungsten carbide.

DETAILED DESCRIPTION

Figure 1:
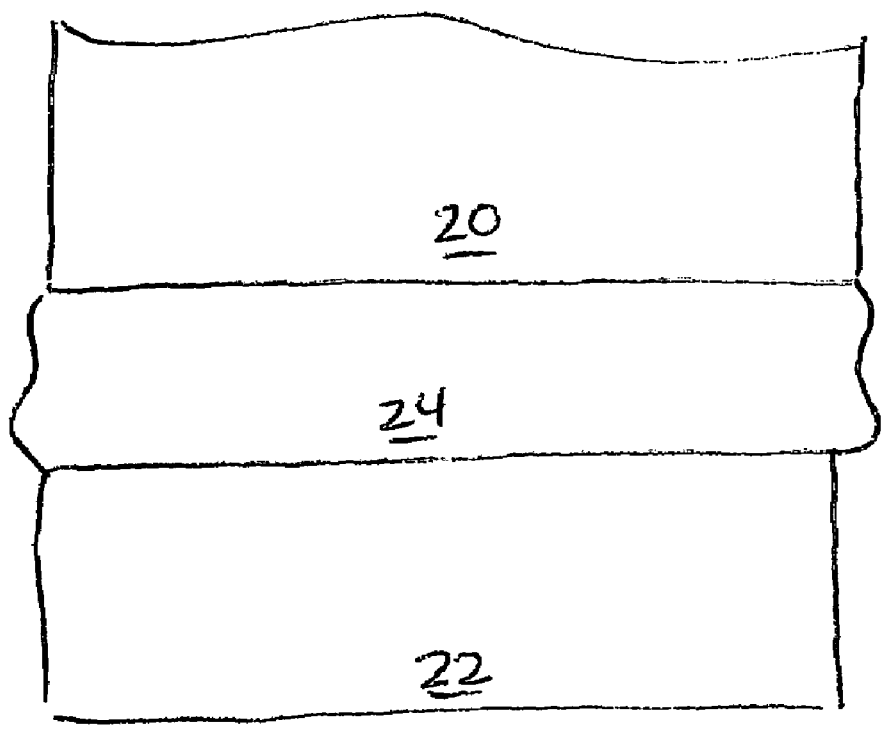
FIG. 1 shows a first base metal member metallurgically joined to a second base metal member by brazing.

The present invention relates to brazing material. More particularly, the present invention relates to a braze alloy that is microalloyed to improve at least one characteristic of the braze alloy. In one or more embodiments, the at least one characteristic improved is the braze strength and/or the corrosion resistance of the braze alloy when used as a brazing material. In selected embodiments, the at least one characteristic is improved without substantially increasing braze temperature when compared to the braze alloy prior to microalloying.

In a previous investigation (K. T. Kembaiyan, *Solute Effects in Dilute Binary Alloys and in Dilute Ternary Copper Alloys* (1987) (Ph.D. dissertation, Stevens Institute of Technology)), the inventor of the present invention discovered that the addition of very small amounts (such as a few hundreds of parts per million) of aggressively surface acting elements from the metalloid group of the periodic table, in particular, tellurium (Te), antimony (Sb), and such kind, were found to significantly increase the strength of copper alloys without significantly effecting the alloy's electrical conductivity. This reference is herein incorporated by reference in its entirety.

The inventor has since turned attention to the development of brazing materials. The inventor has determined that adding miniscule amounts of aggressively surface acting metalloids to braze alloys can result in an increase in the braze joint strength offered by the braze alloy. This is believed to be due to the effective grain pinning characteristics of the resulting microalloyed brazing material. Also, because only miniscule amounts of aggressively surface acting elements are added to the brazing material, the melting temperature of the brazing material, in many cases, will not significantly increase. This, advantageously, allows for the development of enhanced brazing materials offering higher braze joint strength at around the same brazing temperatures as similar braze alloys that do not include these aggressively surface acting elements. In some cases, the addition of these elements may also or alternatively result in the improvement of other brazing material properties, such as improved corrosion resistance. Aggressively surface acting elements aforementioned include a group of metalloids such as tellurium (Te), selenium (Se), antimony (Sb), bismuth (Bi), gallium (Ga), sulfur (S) etc., which have limited solubility in metals. Because of the limited solubility of aggressively surface acting elements, they tend to segregate or form very fine precipitates at the high energy areas of the grain such as the grain boundaries, grain corners and free surfaces.

Referring now to specific embodiments, in one aspect, the present invention provides a brazing material comprising about 0.0005 wt % to about 0.5 wt % of one or more aggressively surface acting elements selected from the metalloid group of the periodic table. Those skilled in the art will appreciate that other aggressively surface acting elements may also be used which would exhibit similar characteristic described.

In accordance with one aspect of the invention, the aggressively surface acting elements are added to a braze alloy composition to improve at least one characteristic of the braze alloy. In one or more embodiments, the at least one characteristic improved is the braze strength. In general, braze strength is considered improved when the shear strength of the braze alloy is increased. Alternatively, or additionally, in one or more embodiments, the at least one characteristic improved is corrosion resistance. In accordance with the above aspect of the invention, because the addition of the alloying elements is in the miniscule level, in one or more embodiments the melting temperature of the braze alloy is not significantly increased by the addition of these microalloying elements.

In accordance with the above description, a conventional braze alloy can be microalloyed to improve at least one characteristic of the braze alloy by adding to its composition at least one aggressively surface acting elements as described above. Conventional braze alloys that can be microalloyed in accordance with this aspect of the invention include silver-, gold-, copper-, nickel-, or aluminum-based braze alloys. Such braze alloys may be microalloyed in accordance with this aspect of the present invention to improve a characteristic of the braze alloy such as the braze strength offered by a conventional alloy.

In one or more embodiments, the brazing material includes silver in an amount of at least about 30 wt % silver (Ag) and is microalloyed by adding between about 0.0005% and about 0.5% of at least one aggressively surface acting element selected from the group of tellurium (Te), selenium (Se), antimony (Sb), bismuth (Bi), and gallium (Ga), or any combination thereof. For selected applications, such as those involving low temperature brazing, the silver (Ag) content may be around 50 wt % or more and may also include copper (Cu), zinc (Zn), and/or tin (Sn). In one embodiment, the brazing material includes at least about 15 wt % copper (Cu), at least about 15 wt % zinc (Zn), and/or at least about 2 wt % tin (Sn).

In another embodiment, a braze alloy consists essentially of between about 40 wt % to about 60 wt % silver, about 15 wt % to about 40 wt % copper, about 10 wt % to about 30 wt % zinc, and about 0.0005 wt % to about 0.5 wt % of at least one aggressively surface acting element selected from the group of tellurium, selenium, antimony, and bismuth, and gallium, or any combination thereof.

Brazing materials in accordance with embodiments of the present invention may contain other trace elements which do not significantly affect the intended performance of the braze material. For example, in one or more embodiments, the brazing material may additionally including trace amounts of iron, silicon, phosphorous, sulfur, platinum, palladium, lead, gold, aluminum, magnesium, germanium, carbon, oxygen, or other elements.

In one or more embodiments wherein the brazing material comprises a silver-based alloy, the aggressively surface acting elements added to a braze material may be limited to an amount that provides for brazing at temperatures of around 1350° F. or below. In one or more embodiments, the aggressively surface acting elements may be added in an amount of 5000 ppm (0.5 wt %) or less to minimize their effect on the braze temperature of the braze alloy. In some cases, to minimize the affects on braze temperature, the aggressively surface acting elements included in the brazing material may be limited to an amount of about 500 ppm (0.05 wt %) or less or, and in some cases, to about 200 ppm (0.02 wt %) or less. It is expected that even these small amounts can result in a measurable increase in braze strength for selected braze alloys. Limiting the amount of these alloying elements to 500 rpm (0.05 wt %) or less, may, advantageously, result in a brazing material having a braze temperature range very similar to that of the braze alloy prior to microalloying.

In one or more embodiments, the aggressively surface acting elements may be limited to an amount of about 100 ppm (0.01 wt %) or less. However, the aggressively surface acting elements will typically be added in an amount of at least about 5 ppm (0.0005 wt %), and in many cases, added in an amount of at least about 10 ppm (0.0001 wt %).

Adding aggressively surface acting elements to a brazing material within the amounts described above can result in improved braze properties, such as increased braze strength and/or increased corrosion resistance of the braze material. In one or more embodiments of the present invention, the braze strength of a brazing material, such as BAg-7 for example, is increased without significantly affecting the liquidus temperature of the braze alloy.

Those skilled in the art will appreciate that brazing materials in accordance with the present invention can be made using any manufacturing techniques well known in the art. Generally, such manufacturing techniques include melting the constituent compositional elements of the alloy together and forming an ingot from the molten alloy. After being produced, the particular braze alloy desired can be provided in a variety of forms suitable for brazing purposes. For example, in one embodiment, the braze alloy can be drawn into wires of suitable diameter as typical used for brazing various products, such as cutters and inserts in rock bits. In another embodiment, the braze alloy may be rolled into sheets of material and punched into discs or wafers of desired dimensions.

Those skilled in the art will appreciate that in other embodiments, a brazing material in accordance with the present invention may be formed in any suitable manner known in the art or cast using any suitable technique known in the art into any desired form. For example, the braze alloys can be in strip form, wire form, rod form, sheet form, foil form, powder form, shot form, chip form, paste form, etc. In the case of a wire or foil form, during the brazing process, the wire or foil is often melted between the base metal members by running the assembly to be brazed through a furnace. For some applications, the furnace may have a protective atmosphere, such as a hydrogen atmosphere, at a temperature of around 1200° F. to 1400° F.

In another aspect, the present invention provides a method for making a braze alloy. In one embodiment, the method includes melting ingredients to provide a substantially homogeneous molten braze alloy. In particular embodiments, the ingredients include at least about 30% by weight silver and between about 0.0005% to about 0.5% by weight of at least one selected form the group of antimony, tellurium, selenium, bismuth, and gallium, or any combination thereof. The method also includes converting the molten braze alloy to a form suitable for use as a brazing material. For example, the braze alloy may be formed into a powder, a paste, or a wire for use as a brazing material. In one or more embodiments, the braze material may further comprise copper, tin, and/or zinc as further described above or below.

Figure 4:
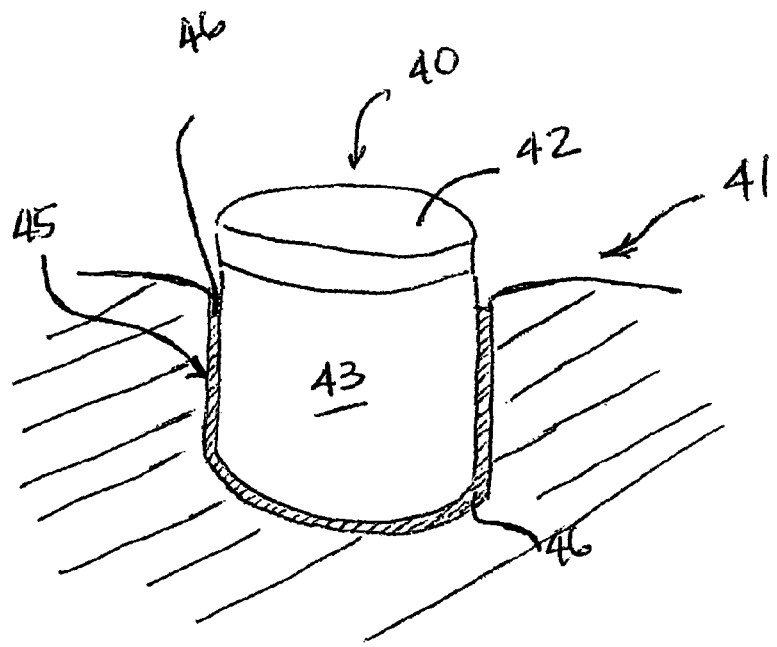
FIG. 4 shows a braze material in accordance with the present invention used to braze a PCD cutter in a cutter pocket of a drill bit.

In another aspect, the present invention also provides a method for joining a first base metal to a second base metal. Referring to FIG. 1, the method includes placing a brazing material (i.e. braze 24) between base metal members 20, 22, wherein the brazing material 24 contains at least about 30% by weight silver and between about 0.0005% to about 0.5% weight of at least one selected from the group of antimony, tellurium, selenium, bismuth, and gallium, or any combination thereof. The method further includes melting the brazing material 24 and allowing the brazing material to solidify between the base members 20, 22 to metallurgically join the base members 20, 22 together. In this way, the brazing material 24 can be used to braze a first base metal member 20 to a second base metal member 22. For example, this method may be used to braze a cutter 40 in a cutter pocket 45 of a drill bit 41 as illustrated in FIG. 4. In one or more embodiments, the brazing material may also include copper, zinc, and/or tin. The silver may be in an amount of at least about 50% by weight. Copper may be included in an amount of 15% or more by weight. Zinc may be included in an amount of about 15% or more by weight. Tin may be included in an amount of at about 2% or more by weight. In one embodiment, the brazing material included: 55-57 wt % silver, 0.0005 wt % to about 0.5 wt % of one or more selected from the group of antimony, tellurium, selenium, bismuth, gallium; about 21-23 wt % copper; about 15-20 wt % zinc; and about 4-6 wt % tin.

In another aspect, the present invention provides a method for increasing the braze strength of a brazing ally while substantially maintaining the braze temperature. The method includes microalloying a braze alloy by adding between about 0.0005 wt % and about 0.5 wt % of one or more aggressively surface acting elements, such as tellurium (Te), selenium (Se), antimony (Sb), bismuth (Bi), or gallium (Ga), or any combination thereof.

In selected embodiments, the braze alloy is a silver based alloy having 30 wt % or more of silver. In one or more embodiments, the silver-based braze alloy may additionally include copper and/or zinc in an amount of 15 wt % or more, and/or tin in an amount of 2 wt % or more.

In another aspect, the present invention provides silver brazing filler metals microalloyed as described above to include at least about 0.0005 wt % to about 0.5 wt % of one or more aggressively surface acting elements to increase the braze strength. Such brazing materials may be used for brazing tungsten carbide and/or steel surfaces together, such as for brazing a cutting element substrate formed of tungsten carbide to a tungsten carbide or steel bit body or cutting tool. For these applications, the silver brazing material may comprise a conventional silver braze alloy adapted for brazing at temperatures in the range of about 1200° F. to about 1400° F. FIG. 5 shows a table listing examples of conventional silver braze alloys that may be microalloyed in accordance with an embodiment of the present invention. This table was obtained from the book, Schwartz, M., *Brazing: for the Engineering Technologist*, (London, Chapman & Hall, 1995), p. 376, which is incorporated herein by reference in its entirety. In particular embodiments for brazing PCD cutters to either bit bodies or cutting tool support structures, the base alloy material selected should be one suitable for brazing at temperatures below 1350° F. (730° C.). The silver braze alloys selected should be one that melts at the aforementioned brazing temperatures and readily wet the base material to be joined without melting the base material. Such a braze alloy can be microalloyed in accordance with an embodiment of the present invention.

Using alloys in accordance with one or more embodiments of the present invention, brazing can be done using a furnace, locally using a torch, using an induction heater, dipped in a braze or flux bath, resistance heated, laser heated, infrared heated, etc. Depending on the brazing technique being employed, brazing may be carried out in an inert gas atmosphere, such as an argon atmosphere, or some other type of protective atmosphere such as a hydrogen or nitrogen atmosphere.

EXAMPLES

One example of a brazing application in which a brazing material is desired which offers improved brazing characteristics is the brazing of PCD cutters to bit bodies. This type of application is a temperature sensitive application. Thus it is desired that the characteristics of the brazing material be improved while maintaining braze temperature at a value at or below 1400° F. to avoid damage to the PCD table of the PCD cutter.

Figure 2:
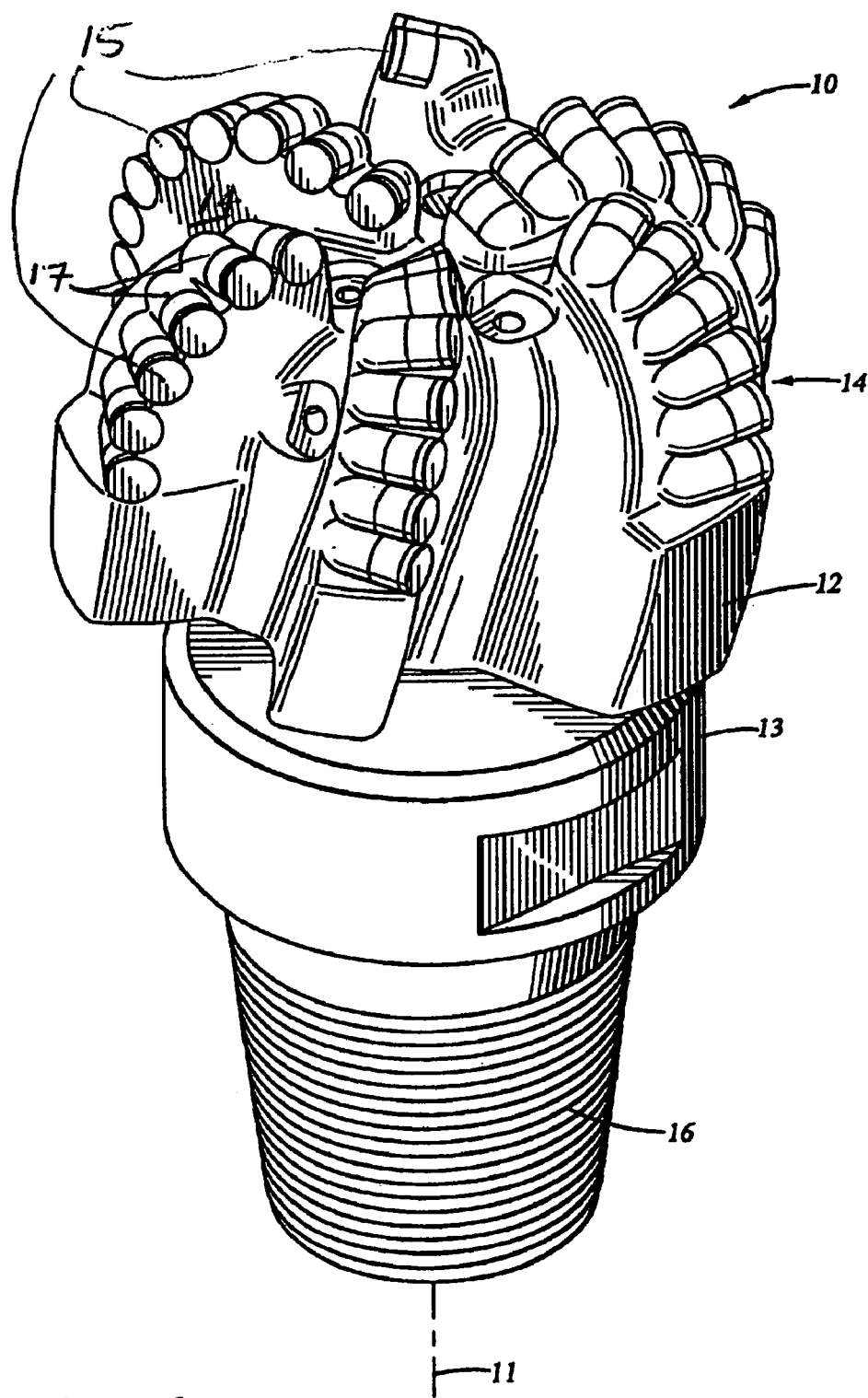
FIG. 2 shows a perspective view of one example of a conventional drill bit.

FIG. 2 shows one example of a fixed-cutter drill bit used for drilling bore holes in subterranean earth formations. The fixed-cutter bit 10 includes a bit body 12 having a threaded connection 16 at one end for connecting to a drilling assembly, and blades 14 extending from the other end. The bit body may be formed of a matrix material infiltrated with binder materials to form the body or a machined steel body. Polycrystalline diamond compact (PDC) cutters 15 are mounted in cutter pockets 17 on the blades 14 and bonded to the cutter pockets 17 by brazing. One example of a method of brazing a cutter to a bit body is disclosed in U.S. Pat. No. 4,453,605, to Short, Jr. The PDC cutters 15 are arranged along the length of each of the blades 14 to engage with earth formation as the bit 10 is rotated under an applied force on the bottom hole of a well bore.

Figure 3:
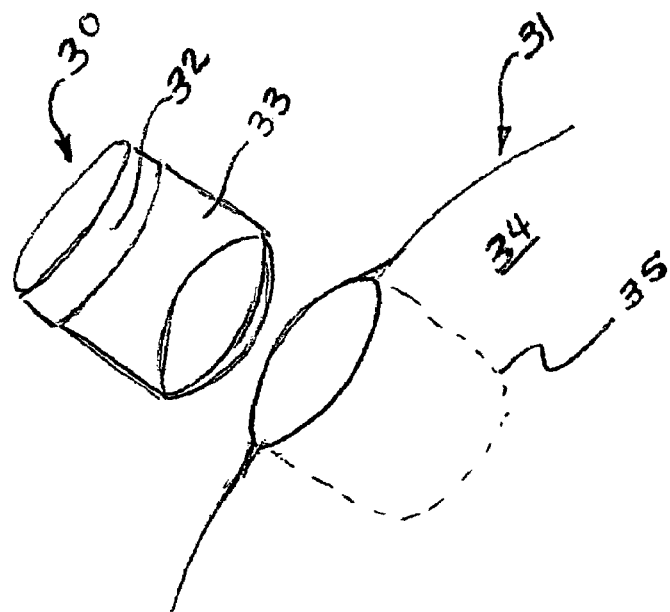
FIG. 3 shows a perspective view of a PCD cutter adapted for attachment to a cutter pocket of a drill bit by brazing.

As shown in FIG. 3, a polycrystalline diamond compact (PDC) 32 comprises a polycrystalline mass of diamonds (typically synthetic) that are bonded together to form an integral, tough, high-strength mass. Polycrystalline diamond compacts 32 have been used in industrial applications including rock drilling and metal machining for many years. In these applications, a compact of polycrystalline diamond (or other superhard material such as cubic boron nitride) 32 is typically bonded to a substrate material 33, which is typically a sintered metal-carbide, to form a cutting element or cutter 30. The polycrystalline diamond (PCD), or polycrystalline boron nitride (PCBN), 32 bonded to the substrate 33 is sometimes referred to as a diamond table or ultrahard layer 32. The substrate 33 and diamond table 32 together form the polycrystalline diamond compact (PDC) cutter 30. Methods for making diamond compacts and composite compacts are more fully described in U.S. Pat. Nos. 3,745,623; 3,609,818; 3,850,591; 4,394,170; 4,403,015; 4,525,178; and 4,647,546; and 4,954,139, which are incorporated herein by reference.

Once a PDC cutter 30 is formed, exposure to high temperatures above 1300° F. should be avoided to minimize thermal damage to the diamond table 32. This temperature limitation reduces the number of brazing materials available for brazing PDC cutters or inserts. In most applications involving the brazing of PDC cutters to cutting tool bodies or cutter pockets 35, such as in the blade 34 of a drill bit 31, silver-based braze alloys are typically used because they offer low enough melting temperatures (i.e., brazing temperatures) to avoid damage to the diamond table during brazing.

Examples of conventional silver-based braze alloys are shown in the table of FIG. 5. The two common braze alloys used for brazing PDC cutters into cutter pockets are referred to as "Bag 1" and "Bag 7", as listed in the table of FIG. 5. At one time, Bag 1 was a most favored braze alloy in the industry because of its low brazing temperature (shown in FIG. 5). However this alloy was later declared environmentally unfriendly because it contained cadmium, which is a carcinogenic. As a result, the use of Bag 1 was outlawed in many countries. Now BAg-7 is one of the primary filler materials of choice for brazing PCD cutting elements to bit or tool bodies. Bag 7 is widely favored and used because it is cadmium-free and has one of the lowest brazing temperatures and best wetting and best flow characteristics of the cadmium-free alloys used for brazing.

BAg-7 is commercially available from manufacturers, such as Bellman-Melcor, Inc. The typical composition and properties of BAg-7 along with other standard silver-based filler metals used for brazing is shown in the table in FIG. 5. As shown in FIG. 5, BAg-7, generally comprises about 55-57 wt % silver (Ag), about 21-23 wt % copper (Cu), about 15-19 wt % zinc (Zn), and about 4.5-5.5 wt % tin as shown in the table. BAg-7 may also include other impurities in an amount of about 0.15% or less.

For drill bits, such as the one shown in FIG. 2, one of the important goals of operation is to maximize the rate at which the bit drills through formation (rate of penetration (ROP)). Because rig rates and drilling operations are very expensive, time saved down hole by drilling a well at a faster rate translates to large savings in the drilling operation. Therefore, the drive in the industry is for drill bits that can drill faster.

One way to increase ROP is with more aggressive bit designs. In the case of PDC bits, this may translate to a more aggressive cutting profile for a bit with cutters on the bit oriented in a more aggressive fashion to gouge the formation during drilling. Providing more aggressive cutter orientations typically reduces the area of bond (braze area) between cutters and the bit body. As a result, some of these more aggressive designs have lead to premature failure of the bit due to a loss of cutters during drilling due to insufficient braze strength as a result of the restricted area of braze. Therefore, there is a desire for a braze alloy offering increased braze strength to avoid loosing cutters during drilling.

In general, braze strength is a function of braze alloy strength and brazable area. When braze area is limited, braze strength can be increased by increasing the yield strength or shear strength of the braze alloy. The strength (yield or shear) of a braze material can be increased by adding alloying elements to the braze alloy. When considering the application of brazing PDC cutters for cutting tools and bit bodies, the problem is that most materials that can be added to braze material to increase braze strength also increases braze temperature. Because braze temperature must be kept low to avoid damage to the PDC cutters during brazing, these elements can not be added to the braze alloy used for temperature sensitive applications, such as brazing PDC cutters to bit bodies.

In some applications or under a given set of conditions, the strength of the braze may be reduced such that the PDC cutter may be forced out of the cutter pocket, thereby altering a cutting structure and, e.g., a force distribution over the bit. If a significant number of PDC cutters are forced from their respective pockets, drilling operations may have to be stopped so that a new bit can be attached. This can be a very expensive operation in drilling time and rig cost.

Conventional alloying elements typically added to braze alloy will typically increase the melting point of the braze alloy, resulting in a higher temperature for brazing. Higher brazing temperature will impart thermal damage to the PDC cutters, especially to the diamond layer. A braze alloy which offers improved braze strength without significantly affecting the liquidus temperature of the braze alloy is desired for applications such as the one described above. Additionally, there is a general desire for braze alloys that offer improved brazing characteristics, such as higher braze strength and/or improved corrosion resistance.

In accordance above aspects of the present invention, the conventional silver-based braze alloy such as a BAg-7 alloy is microalloyed to increase braze strength by adding miniscule amounts of aggressively surface acting elements. The aggressively surface acting elements added to the braze alloy composition include one or more selected from the group of tellurium (Te), selenium (Se), antimony (Sb), bismuth (Bi), and gallium (Ga). These elements are added to the composition of BAg-7 in an amount of between about 5 ppm (0.0005 wt %) and 5000 ppm (0.5 wt %). For some samples, to minimize affects on braze temperature, the aggressively surface acting elements may be only added in amounts of about 500 ppm (0.05 wt %) or less to ensure brazing temperature in a range suitable for temperature sensitive applications, such as to mitigate damaging a polycrystalline diamond table of a cutter during brazing. In one case, the amount of aggressively surface acting elements added to the braze alloy is below 200 ppm (0.02 wt %) to provide an increase in braze strength while minimizing the effect on braze temperature.

Referring to FIG. 4, a braze alloy (braze 46) in accordance with the above description may be used to braze a cutter 40 in a cutter pocket 45 of a drill bit 41 (see FIG. 2). The brazing material 46 is disposed between the surfaces of the cutter pocket 45 and the substrate 43 of the cutter 40. Cutters can be placed likewise in other cutter pockets of a drill bit (10 in FIG. 2) with the brazing material 46 disposed in between. In one case, the drill bit 41 may be pre-heated in a furnace and then sufficient heat applied to the brazing material 46 to melt the brazing material 46 between the cutter 40 and the cutter pocket 45. The bit is then removed and the brazing material 46 is allowed to cool and solidify, which metallurgically bonds the cutter 40 to the surfaces of the cutter pocket 45.

A braze alloy, such a Bag 7 described above (having about 56% by weight silver, 22% by weight copper, 17% by weight Zinc, 5% by weight tin), with and without microalloying in accordance with an embodiment of the present invention, can be compared to show that embodiments in accordance with the present invention can provide braze alloys having comparable braze properties with a measurably higher braze strength. In selected embodiments a higher braze strength can be obtained while still maintaining similar braze temperatures. Additionally, one or more embodiments in accordance with the present invention may be used to provide a braze alloy that provides a more corrosive resistant braze.

A braze alloy as described above may be used to braze a cutter to one selected from the group of a bit body such as polycrystalline (PDC) drill bit body, an impregnated bit body, a hammer bit body or a brazed milled tooth body. In one or more embodiments, a braze alloy as described herein may also be used in applications where higher braze strength is desired without increasing the melting point of the braze alloy. In one or more embodiments, a brazing material may be provided in a form such as one selected from the group of a powder, a disc, a wafer, a paste, and a wire. In one or more embodiments, braze alloy coated or impregnated base metals can be joined by any brazing process known in the art or described above.

Embodiments of the present invention may include one or more of the following advantages. One or more embodiments may provide a low temperature brazing material having improved braze strength. In one or more embodiments, aggressively surface acting elements may be added to a braze alloy in miniscule amounts to increase the braze strength. In one or more embodiments, the braze strength of a brazing material is increased without significantly affecting braze temperature. Microalloying a braze alloy in accordance with one or more embodiments of the present invention may be particularly useful in temperature sensitive applications wherein an increase in braze strength is desired without sacrificing braze temperature. Advantageously, embodiments of the invention may be developed for brazing cutters to drill bit or cutting tool bodies which may allow for more aggressive bit and cutter tool designs due to the increase in braze strength. In one or more embodiments, a brazing material may be microalloyed and to braze cutters in cutter pockets of a drill bit body, which offers higher braze strength, good cutter retention, and/or improved performance to extend the life of a drill bit. Other advantages for other embodiments will be apparent to those of ordinary skill in the art in view of the descriptions above.

While the present invention has been described with respect to specific embodiments and applications thereof, numerous alternatives, modifications, and applications, and variations will be apparent to those skilled in the art having read the foregoing description. The invention is intended to embrace those alternatives, modifications, and variations as fall within the broad scope of the appended claims. Accordingly, the scope of the invention should be limited only by the attached claims.

What is claimed is:

1. A drill bit comprising:
    a bit body;
    a cutter mounted on the bit body;
    a brazing material disposed between the cutter and the bit body attaching the cutter to the bit body, the brazing material comprising silver in an amount of at least about 30% by weight and at least one selected from the group of antimony, tellurium, selenium, bismuth in an amount of at least about 0.0005% and less than 0.5% by weight.

2. The bit of claim 1, wherein the brazing material comprises silver in an amount of at least 50% by weight.

3. The bit of claim 1, wherein the brazing material further comprises copper in an amount of at least about 15% by weight.

4. The bit of claim 1, wherein the brazing material further comprises zinc in an amount of at least about 15% by weight.

5. The bit of claim 1, wherein the brazing material comprises silver in an amount of at least 50% by weight and further comprises copper in an amount of at least about 15% by weight, zinc in an amount of at least about 15% by weight, and tin in an amount of at least about 2% by weight.

6. The bit of claim 1, wherein the bit body is one selected from the group of polycrystalline drill bit body, an impregnated bit body, a hammer bit body or a brazed milled tooth body.

7. The bit of claim 1, wherein the brazing material comprises the silver in an amount of 55-57% by weight and further comprises copper in an amount of 21-23% by weight, zinc in an amount of 15-20% by weight, and tin in an amount of 4-6% by weight.

8. The bit of claim 7, wherein the brazing material comprises the silver in an amount of about 56% by weight and further comprises copper in an amount of about 22% by weight, zinc in an amount of about 17% by weight, and tin in an amount of about 5% by weight.

9. The bit of claim 1, wherein the at least one comprises antimony.

10. The bit of claim 1, wherein the at least one comprises tellurium.

11. The bit of claim 1, wherein the at least one comprises bismuth.

12. The bit of claim 1, wherein the at least one comprises selenium.

13. A drill bit comprising:
a bit body;
a cutter mounted on the bit body;
a brazing material disposed between the cutter and the bit body attaching the cutter to the bit body, the brazing material comprising silver in an amount of at least about 30% by weight and at least one selected from the group of antimony, tellurium, selenium, bismuth, gallium in an amount of at least about 0.0005% and less than 0.5% by weight, wherein the brazing material further comprises tin in an amount of at least about 2% by weight.

14. A drill bit comprising:
a bit body;
a cutter mounted on the bit body;
a brazing material disposed between the cutter and the bit body attaching the cutter to the bit body, the brazing material comprising silver in an amount of at least about 30% by weight and at least one selected from the group of antimony, tellurium, selenium, bismuth, and gallium in an amount of at least about 0.0005% and less than 0.05% by weight.

15. The bit of claim 14, wherein the brazing material comprises the at least one selected from the group of antimony, tellurium, selenium, bismuth, and gallium in an amount of about 0.002% by weight or less.

16. The bit of claim 14, wherein the brazing material comprises the at least one selected from the group of antimony, tellurium, selenium, bismuth, and gallium in an amount of about 0.001% by weight or less.

17. The bit of claim 14, wherein the brazing material comprises the silver in an amount of 55-57% by weight and further comprises copper in an amount of 21-23% by weight, zinc in an amount of 15-20% by weight, and tin in an amount of 4-6% by weight.

18. The bit of claim 17, wherein the brazing material comprises the silver in an amount of about 56% by weight and further comprises copper in an amount of about 22% by weight, zinc in an amount of about 17% by weight, and tin in an amount of about 5% by weight.

19. The bit of claim 14, wherein the at least one comprises antimony.

20. The bit of claim 14, wherein the at least one comprises tellurium.

21. The bit of claim 14, wherein the at least one comprises bismuth.

22. The bit of claim 14, wherein the at least one comprises selenium.

* * * * *